United States Patent [19]

Hirtz et al.

[11] Patent Number: 4,580,762
[45] Date of Patent: Apr. 8, 1986

[54] CLOSURE DEVICE FOR A LIQUID-CARRYING PIPE

[75] Inventors: Alfred Hirtz, Boulogne Billancourt; Jacques Caillet, Paris, both of France

[73] Assignee: Alsthom, Paris, France

[21] Appl. No.: 759,400

[22] Filed: Jul. 26, 1985

[30] Foreign Application Priority Data

Aug. 3, 1984 [FR] France ............................. 84 12326

[51] Int. Cl.⁴ ............................................. F16K 25/00
[52] U.S. Cl. .................................... 251/159; 251/161; 251/162; 251/174; 251/188
[58] Field of Search ............... 251/159, 161, 162, 163, 251/174, 188

[56] References Cited

U.S. PATENT DOCUMENTS

| 3,134,396 | 5/1964 | Bredtschneider | 251/174 X |
| 3,150,681 | 9/1964 | Hansen | 251/174 X |
| 3,273,852 | 9/1966 | Ripert | 251/174 X |
| 3,920,036 | 11/1975 | Westenrieder | 251/174 X |

FOREIGN PATENT DOCUMENTS 403389 12/1933 United Kingdom ............... 251/174

*Primary Examiner*—Harold W. Weakley
*Attorney, Agent, or Firm*—Sughrue, Mion, Zinn, Macpeak, and Seas

[57] ABSTRACT

The device comprises a body (1) provided with two coaxial circular openings (3, 4) for connecting two sections of pipe, wherein each opening has an oblique seat (5, 6) receiving a wedge formed of two counter-seats (9, 10), a spherical ball (11) and a cage (12) in which the ball carries elastic means (23) which exert a pressure from said wedge on its seats (5, 6), and a rod (26) enabling said wedge to be unwedged, said ball being provided with a rotation shaft (13) and springs (18) enabling the counter-seats to be detached from the ball in the unwedged position of the wedge.

5 Claims, 4 Drawing Figures 4,580,762

CLOSURE DEVICE FOR A LIQUID-CARRYING PIPE

The present invention relates to a closure device for a liquid-carrying pipe.

A ball valve with a spherical closure device is known, in particular from U.S. Pat. No. 4,203,460, which comprises a body in which are formed a valve chamber and two passages with respective openings which communicate with the valve chamber, sealing component support means comprising annular, approximately flat surfaces formed around the openings of the passages, said surfaces converging in a first direction, a spherical component or ball for fluid control which is rotatably mounted in the valve chamber and contains a through bore so as to connect the passages when the spherical component is in an open position, annular sealing means arranged between the sealing component support means and the rotatable spherical component so as to provide a fluid-tight joint between them and means for turning the rotatable spherical component between an open position and a closed position, said valve being characterized in that it comprises a mechanism connected to the rotatable spherical component so as to move the rotatable spherical component in a first direction in order to increase the seal between the rotatable spherical component and the annular sealing means, when the valve is in an open or closed position, and so as to move the rotatable spherical component in a second direction, opposite to the first direction, in order to reduce this seal so as to facilitate the operation of the valve between the open and closed positions.

The sealing means have upper and lower parts. Such a valve has a number of disadvantages: friction between the rotatable spherical component and the annular sealing means is not eliminated during the rotation of the rotatable spherical component. The result is that the sealing means risk being scratched which would cause lowering of the sealing quality of the valve.

The sealing means are not coaxial, but are convergent. When the ball component is seated (movement in the first direction), there is a resulting vertical pressure which produces damaging overpressure on the lower annular sealing means.

Likewise, overpressure on the lower annular sealing means appears in the open or closed position of the valve, causing deformation and/or wear of said sealing means.

When the valve ball is unseated (movement in the second direction), there is overpressure on the upper parts of the sealing means.

Finally, there is a risk of the support means for the sealing means jamming through operation of the mechanism.

An object of the present invention is to provide a closure means which does not have the above disadvantages, in particular which avoids any wear of the sealing means and which eliminates any risk of jamming of the support means for the sealing means.

The object of the present invention is a closure device for a liquid-carrying pipe, comprising a hollow fluid-tight valve body provided with two circular openings having a same first axis and intended to be connected to two sections of the pipe, each of the two said openings comprising, on the interior side to the body, an annular seat which is integral to the body and having as its axis said first axis, with the opposite surfaces of the two seats forming the seat for a closure wedge composed of two annular counter-seats having as their axis said first axis and each mounted between one of said seats and a hollow ball which is placed inside a cage and contains a rotatable shaft having a second axis perpendicular to said first axis and capable of pivoting in the cage around said second axis, with the surface of the counter-seats situated on the side of the hollow ball comprising a spherical bearing surface centered on said first axis and cooperating with the ball, said ball being bored with a channel having a circular cross-section of the same diameter as the internal diameter of the seats and counter-seats, having an axis perpendicular to said second axis and passing through the center of the ball, with each counter-seat being maintained radially by the cylindrical wall of a circular lateral cavity of the cage and being pushed against its seat by elastic means arranged between the cage and the counter-seat, with the cage being maintained in the body with only freedom of axial translation along said second axis, the device in addition comprising means enabling the closure wedge to be held against the two said seats and means for unwedging the closure wedge outside of its two seats.

The invention will be more clearly understood from the following description of an example of one particular embodiment of the invention in light of the attached drawings in which.

Figure 3:
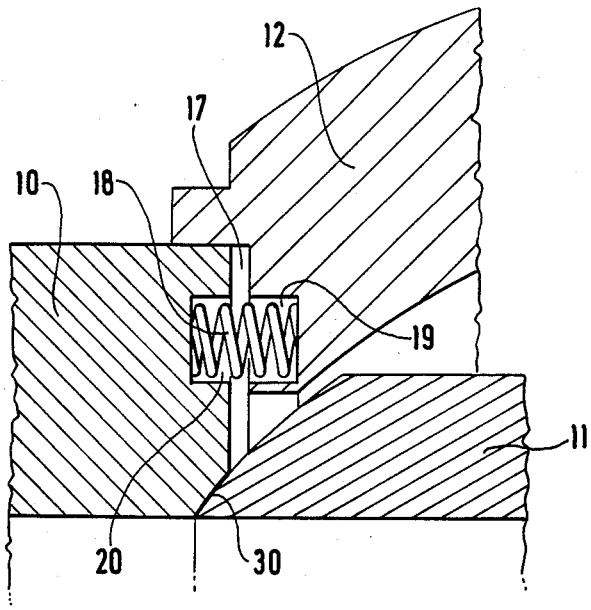
FIG. 3 is an enlarged view of detail III of FIG. 2.

The closure device according to the invention comprises a hollow valve body 1 which is hermetically closed on its upper part by means of a cover 2. This valve body is fluid-tight and is provided with two circular coaxial openings 3 and 4 having an axis Δ, which are provided one opposite the other in the wall of the body. These openings are intended to be connected to two sections of pipe which are not shown. On the valve body interior, opening 3 is provided with an annular seat 5 which is connected to the body 1 for example by soldering. It can also be made integrally with body 1. The interior opening of the annular seat 5 has the same diameter as opening 3. Likewise, opening 4 is also provided with an annular seat 6. The planar surfaces 7 and 8, which are opposite one another, of the two seats form a dihedron so as to form a housing for the seat of a closure wedge. The closure wedge is formed of an assembly of several components: two counter-seats 9 and 10, a hollow spherical member or ball 11 and a cage 12. The counter-seats 9 and 10 are annular, have the same axis Δ as the seats 5 and 6 and the openings 3 and 4 and have the same interior diameter. Counter-seat 9 is placed between seat 5 and the ball 11 and counter-seat 10 is placed between seat 6 and the ball. The bearing surface of each counter-seat 9 or 10 against the ball 11 contains a corresponding spherical bearing surface 30 (FIG. 3), which is centered on the axis Δ.

The ball 11 is hollow with a center 0 situated on the axis and comprises a rotation shaft 13 with an axis γ perpendicular to axis Δ, which passes through the cover 2 of the valve body through a stuffing box 14. The ball, which is situated inside the cage 12, can turn in said cage around axis γ. The cage 12 is made in two parts which are assembled along a joint plane 15 by a circular series of bolts (not shown). The ball is bored from one side to the other in the form of a groove 31 with a circular cross section, the diameter of which is equal to the interior diameter of the seats, counter-seats and openings 5, 6, 9, 10, 3 and 4; its axis is perpendicular to axis γ and passes through the center 0 of the ball. The lateral surfaces of cage 12, on the right and on the left, contain, respectively, a lateral circular cavity, 16 on the right and 17 on the left, whose cylindrical wall radially supports the corresponding counter-seat, 9 or 10.

In addition, an annular series of springs 18 (see FIG. 3) is arranged between each counter-seat 9, 10 and cage 12 at the location of the circular cavities 16, 17. They are supported by small circular cavities 19, 20 provided in the cage and in the counter-seats. These springs have the effect of permanently maintaining the counter-seats 9, 10 against their respective seats 5, 6.

Play j is just sufficient play such that the ball 11 is centered in the counter-seats independently of the cage.

Figure 4:
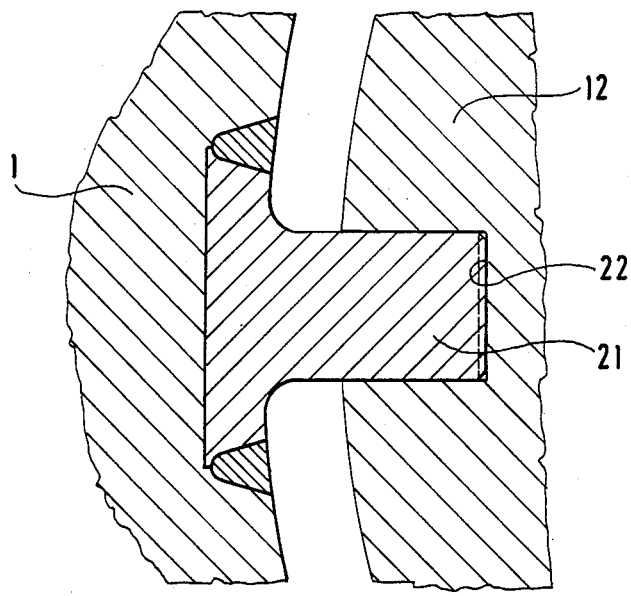
FIG. 4 is an enlarged partial cross-section along IV—IV of FIG. 2.

Fully fitted, cage 12, ball 11 and counter-seats 9 and 10 form a wedge assembly, which can move axially along axis γ. For this purpose, a guiding system enabling this single movement comprises two guides 21 fixed to body 1 opposite to each other and on either side of cage 12, each of which extends into a groove 22 provided in the cage (FIG. 4). Elastic disks 23 exert pressure on the upper part of the cage 12 by taking support on a ring screw 24 which can be screwed into body 1, thus enabling the force of pressure to be adjusted. Means 25 allow manipulation of the screw 24.

Opposite shaft 13, an operating rod 25 passes through the valve body 1 through a stuffing box 27. This rod is axially mobile, either directly or by screwing or by any other means and can, therefore, displace the bottom of the cage 12 in order to unblock the wedge assembly.

Figure 1:
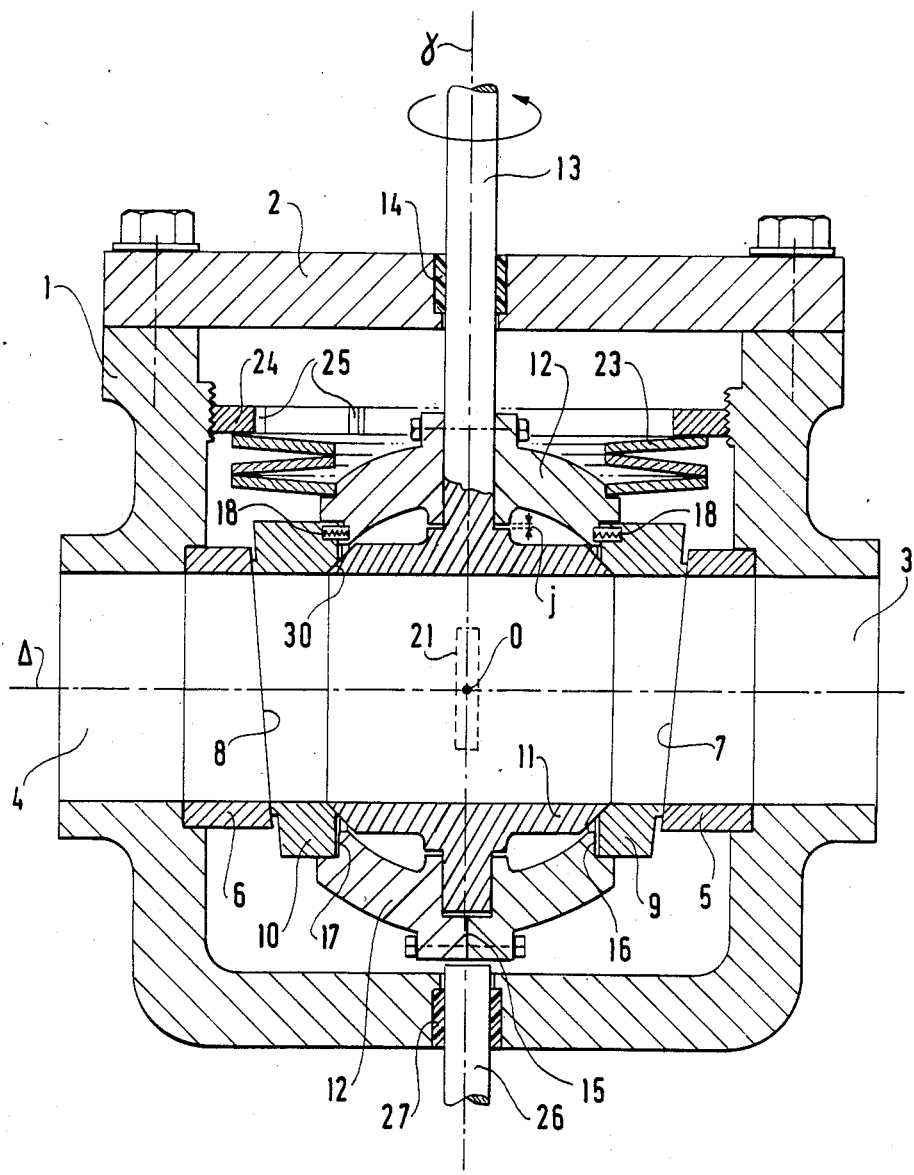
FIG. 1 is a cross-section of a closure device according to the invention in the open position.
Figure 2:
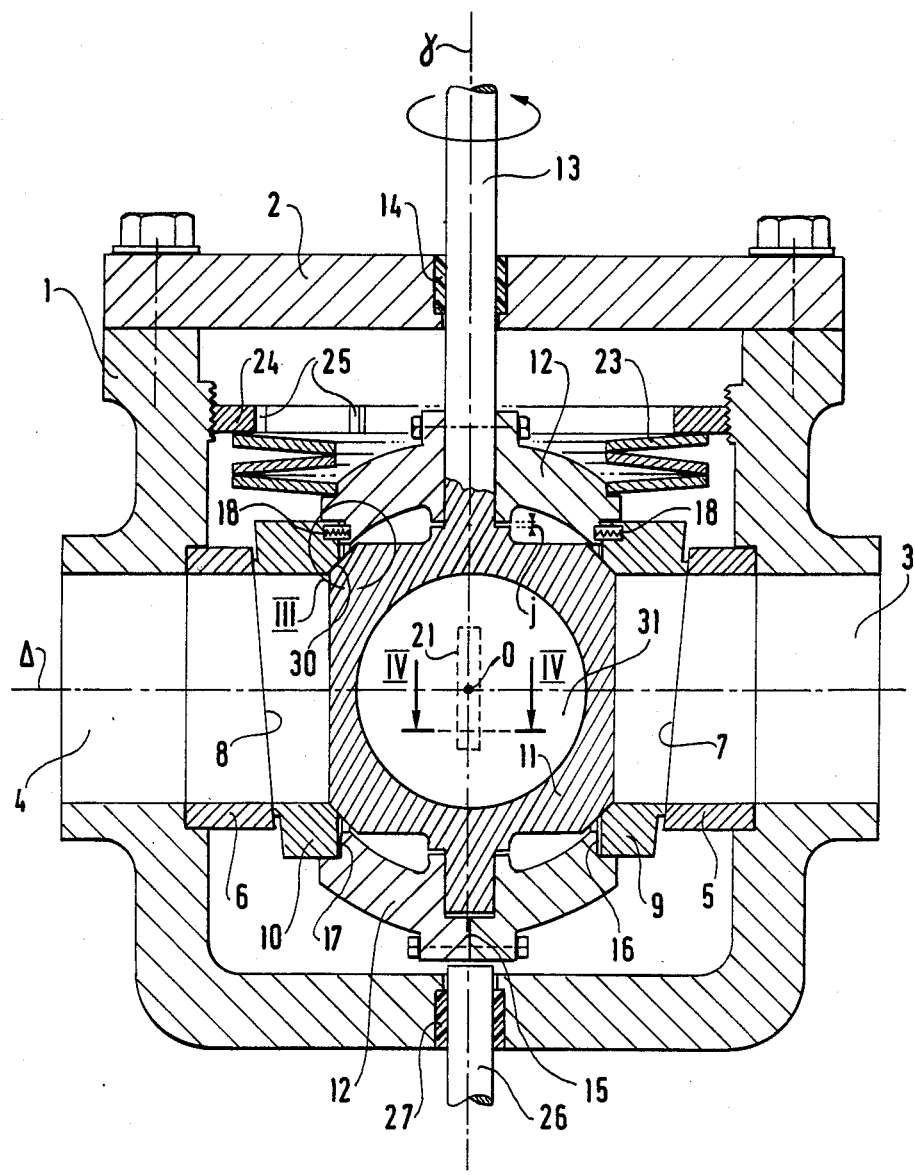
FIG. 2 is a equivalent view to that of FIG. 1 but in the closed position.

FIG. 1 shows the closure device in the open position and FIG. 2 in the closed position.

Passage from one position to the other takes place in the following manner.

The wedge assembly is released by raising it by action of the operating rod 26 against cage 12. By this action, the counter-seats 9 and 10 separate slightly from the ball 11 due to the springs 18 which maintain the counter-seats against their respective seats.

The ball 11 can then be turned a quarter of a turn without fear of wear on the spherical bearing surfaces of the ball and the counter-seats. Once the quarter of a turn has been made, the action on the operating rod 26 is released and the wedge resumes its blocked position under the action of the elastic disks 23 whose pressure is adjusted so as to obtain the necessary seal between seats and counter-seats on the one hand and between the counter-seats and the ball on the other hand.

Passage from the open position to the closed position is preferably carried out by a rotation of a quarter of a turn in one direction then in the reverse direction, by action on shaft 13. However, of course, the rotation can be continued in the same direction.

The actions on the operating rod and on the rotation shaft 13 can, of course, be motorized and their successive actions can be automatically synchronized.

The closure device of the invention has the advantages which are peculiar to valves with wedges and spherical balls:

For valves with wedges, the closure device blocks by a wedging effect, hence irreversibility of the system. Any modification of the position of the closure device must be made by control components.

For hollow balls, there is the integral passage of the stream, hence absence of detachments, loss of load reduced to the minimum as well as sound level connected to the flow, since in the open position there is a continuity of the pipe system. The closure is carried out rapidly by a simple quarter of a turn.

In addition to the above advantages, the invention has the following advantages:

During flow unblocking, there is complete liberation of the contacts between the ball 11 and the counter-seats 9 and 10; there is therefore operation of the ball without friction or wear of the spherical zones between the ball and the counter-seats; the life of the device is therefore lengthened; therefore, the sealed zones can, inter alia, be metallic, which enables the device to be used for high temperatures, a field in which plastic and thermoplastic sealing materials cannot be used.

The functional plays which exist between the cage 12 and the counter-seats 9 and 10 enable the counter-seats to adapt to the slope of seats 5 and 6 at all times.

The elastic disks 23 contribute to maintaining the irreversibility of the wedge during possible shocks: in addition, as well as providing the desired contact pressure at the level of the sealing zones between the ball and the counter-seats and between the seats and the counter-seats, they maintain the closure device in the desired position (open or closed) and thus prevent any vibration which could be produced by internal components which are not held in place.

During raising of the closure assembly, cage 12 provides complete removal of the contacts at the level of the spherical sealing bearing surfaces 30, due to the interposition of springs 18 which are mounted cylindrically, since in this manner the counter-seats 9 and 10 remain held on surfaces 7 and 8, thus providing the following advantages:

(a) no wear on the sealing bearing surfaces 30 during the quarter turn rotation because there is no lateral friction of the spherical sealing zones as in the prior art devices;

(b) no wear or deterioration of these same bearing surfaces during penetration of the closure device, since kinematically the drawing close of the ball 11 and the counter-seats 8 and 10 is purely axial with axis Δ; the ball and counter-seats assembly work in this phase like a double valve, that is, by contact and without friction.

Cage 12 enables direct transmission of the flow blocking-unblocking stresses to the counter-seats, with the ball simply being centered, and the sealing zones undergo no overpressure (in relation to the necessary nominal specific pressure) in their lower half during blockage and maintenance in the open or closed position, or in their upper half during unblocking.

The spherical sealing zones 30 are coaxial with axis Δ, which enables, on the one hand, transmission of the stresses between the ball and the counter-seats on the axis Δ, and, thus, to avoid any parasite component of overpressure, and, on the other hand, good centering of the ball in the closure assembly.

The sealing stress is well controlled at the level of surfaces 7, 8 and 30 due to the "determined" effort provided by the disk-springs 23. This principle of blocking moreover provides free differential expansion between closure device and the body (said expansion being taken up by an elastic component, which are said disk-springs), and therefore it is possible to use the closure device for high temperature liquids carried.

What is claimed is:

1. A closure device for a liquid-carrying pipe, comprising a hollow fluid-tight valve body provided with two circular openings having a same first axis and intended to be connected to two sections of the pipe, each of the two said openings comprising, on the interior side of the body, an annular seat which is integral with the body and having as its axis said first axis, with the opposite surfaces of the two seats forming the seat for a closure wedge composed of two annular counter-seats having as their axis said first axis and each mounted between one of said seats and a spherical ball which is placed inside a cage and contains a rotatable shaft having a second axis perpendicular to said first axis and being capable of pivoting in the cage around said second axis, with the surface of the counter-seats situated on the side of the spherical ball comprising a spherical bearing surface centered on said first axis and cooperating with the spherical ball, said ball being bored with a channel having a circular cross-section of the same diameter as the internal diameter of the seats and counter-seats, having an axis perpendicular to said second axis and passing through the center of the ball, with each counter-seat being maintained radially by the cylindrical wall of a circular lateral cavity of the cage and being pushed against its seat by elastic means arranged between the cage and the counter-seat, with the cage being maintained in the body with only freedom of axial translation along said second axis, the device in addition comprising means enabling the closure wedge to be held against the two said seats and means for unwedging the closure wedge outside of its two seats.

2. The closure device of claim 1, wherein the means for maintaining the closure wedge against the two seats comprises elastic means bearing on the one hand on said cage and on the other hand against a component which is integral with the body, said means in addition enabling adjustment of the distance separating the two supports.

3. The closure device of claim 1, wherein the means for unblocking the closure wedge from its seats comprises an operating rod passing through the wall of the opposite side of the rotation shaft of the cage in a sealed manner, said rod being axially mobile upon command, so as to be able to push back the wedge by acting against the cage.

4. The closure device of claim 1, wherein the elastic means pushing each counter-seat against its respective seat is composed of an annular series of springs arranged between the counter-seats and the cage at the level of said lateral cavity in the cage.

5. The closure device of claim 1, in which the rotation shaft of the spherical ball passes through at least one wall of said body in a sealed manner.

* * * * *